(12) United States Patent
Zhong

(10) Patent No.: US 8,221,623 B2
(45) Date of Patent: Jul. 17, 2012

(54) DEMOUNTABLE FILTERING DEVICE

(75) Inventor: Weijun Zhong, Xiamen (CN)

(73) Assignee: Tsann Kuen (China) Enterprise Co., Ltd., Xiamen, Fujian (CN)

(*) Notice: Subject to any disclaimer, the term of this patent is extended or adjusted under 35 U.S.C. 154(b) by 540 days.

(21) Appl. No.: 12/400,786

(22) Filed: Mar. 9, 2009

(65) Prior Publication Data

US 2009/0223888 A1     Sep. 10, 2009

(30) Foreign Application Priority Data

Mar. 10, 2008   (CN) .................... 2008 2 0101612 U

(51) Int. Cl.
*B01D 29/00*     (2006.01)
(52) U.S. Cl. ............... 210/232; 210/238; 210/473
(58) Field of Classification Search .............. 210/232, 210/238, 473, 474, 475, 476
See application file for complete search history.

(56) References Cited

U.S. PATENT DOCUMENTS

| | | | |
|---|---|---|---|
| 644,262 A * | 2/1900 | Stair .............................. 210/238 |
| 3,637,331 A * | 1/1972 | Smith et al. ................. 417/423.9 |
| 4,207,631 A * | 6/1980 | Baggey ............................. 4/286 |
| 4,832,845 A * | 5/1989 | Hendretti ...................... 210/470 |
| 4,865,737 A * | 9/1989 | McMichael ................... 210/477 |
| 5,932,098 A * | 8/1999 | Ross .............................. 210/337 |
| 6,716,348 B1 * | 4/2004 | Morgan ........................ 210/232 |
| 7,087,166 B1 * | 8/2006 | Sudo et al. .................... 210/232 |
| 2008/0173578 A1 * | 7/2008 | McKenzie .................... 210/232 |

* cited by examiner

*Primary Examiner* — Fred Prince
(74) *Attorney, Agent, or Firm* — Kening Li; Pinsent Masons LLP

(57) ABSTRACT

A demountable filtering device is mounted inside a food processor or coffee pot, and comprises a shell and a filter, wherein the filter is detachably mounted in the shell, and the filter has a handle for the user. The filter can be separated from the shell, so the filter can be demounted and be cleaned after use.

10 Claims, 6 Drawing Sheets

DEMOUNTABLE FILTERING DEVICE

CROSS REFERENCE TO RELATED APPLICATIONS

This application claims priority to Chinese Patent Application No. 200820101612.x, filed on Mar. 10, 2008, the entire disclosure of which is hereby incorporated by reference.

FIELD OF THE INVENTION

The present invention relates to a filtering device and more particularly to a demountable filtering device in a food processor or a coffee pot.

BACKGROUND OF THE INVENTION

Traditional filters are fixed in the food processor and coffee pot. Because the filters cannot be separated from the food processor or the coffee pot, it is inconvenient for cleaning after use.

SUMMARY OF THE INVENTION

The primary object of the present is to overcome the disadvantages existed in the prior art that the filters cannot be separated from the food processor or coffee pot.

This object is achieved by providing a demountable filtering device, mounted inside the food processor or coffee pot, comprising a shell and a filter, the filter detachably mounted in the shell.

In a preferred embodiment of the present invention, the filter has a handle.

In a preferred embodiment of the present invention, the filter housed within the shell capable rotating and travelling vertically within said shell; the shell comprising a circular wall, and there are protrusions for blocking the filter in the inner surface of the wall; the periphery of the filter has grooves along axial direction for passing through the protrusions.

In a preferred embodiment of the present invention, the filter is located beneath the protrusions. The grooves and the protrusions are not in alignment.

In a preferred embodiment of the present invention, the protrusions disposed on the inner surface of the circular wall uniformly and these protrusions are in a same axis height.

In a preferred embodiment of the present invention, the protrusions disposed on the inner surface of the circular wall uniformly in two arrays and each protrusion of a same array are in a same axis height.

In a preferred embodiment of the present invention, the demountable filtering device further comprising a plunger positioned between the two protrusion arrays and the filter positioned beneath the upper protrusion array.

In a preferred embodiment of the present invention, the filter comprising a ring and a slice connected in the lower portion of the inner side of the ring.

In a preferred embodiment of the present invention, the grooves are arranged on the ring.

In a preferred embodiment of the present invention, the two ends of the handle pivotally connected to the ring.

In a preferred embodiment of the present invention, the two ends of the handle fixed on the slice.

Compared with the prior art, the present invention has the following advantages: the filter can be separated from the shell and can be demounted for cleaning after using. When in working status, the filter is beneath the protrusions, the grooves and the protrusions are not in alignment, so the filter can be easily separated from the shell by rotating the filter to let the grooves aim at the protrusions. The plunger positioned between the two protrusion arrays, the filter positioned beneath the upper protrusion array to form an one-cup filter. The two ends of the handle pivotally connected to the ring. When in use, the handle part abut against the slice, this will not affect the use of the filter. The two ends of the handle fixed on the slice. This occupied limited room and will not affect the use of the filter.

BRIEF DESCRIPTION OF THE DRAWINGS

All of the characteristics and advantages as explained above will be understood more easily on the basis of the following description that makes reference to the attached drawings, in which a preferred embodiment is shown.

DESCRIPTION OF THE PREFERRED EMBODIMENTS

Figure 1:
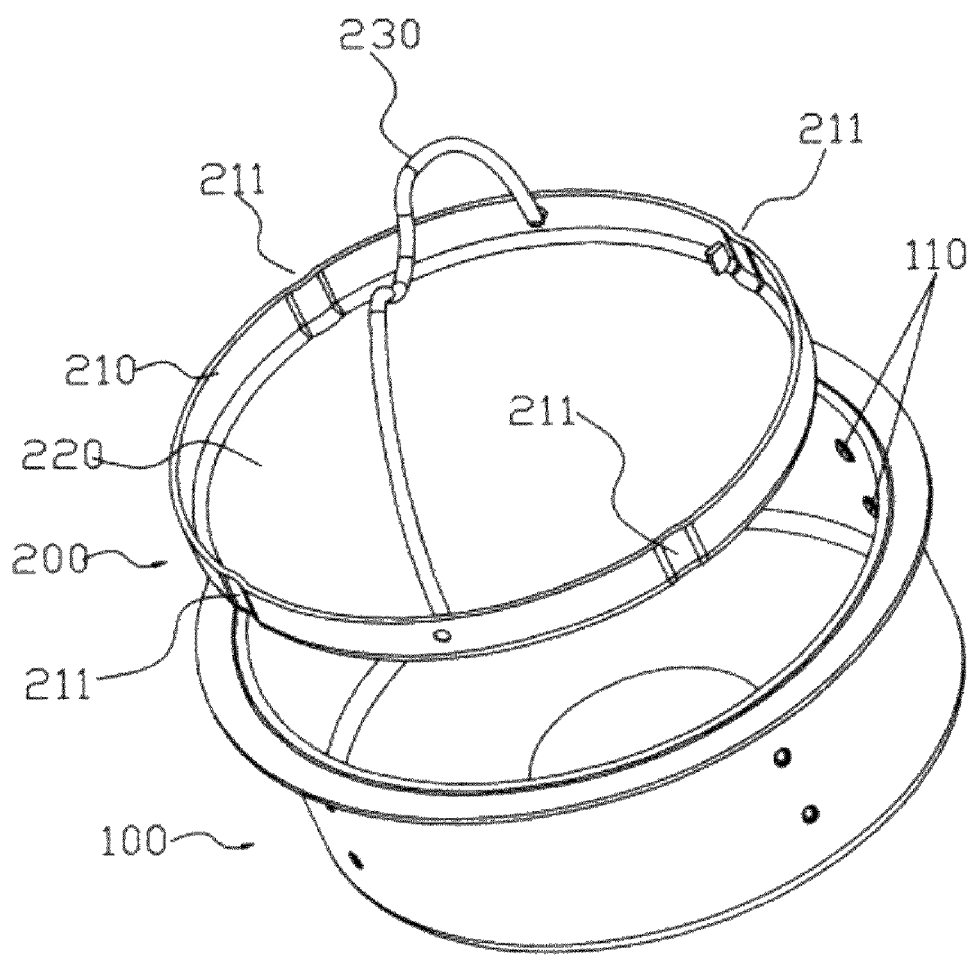
FIG. 1 is an exploded view of the filter device in a preferred embodiment of the present invention.
Figure 2:
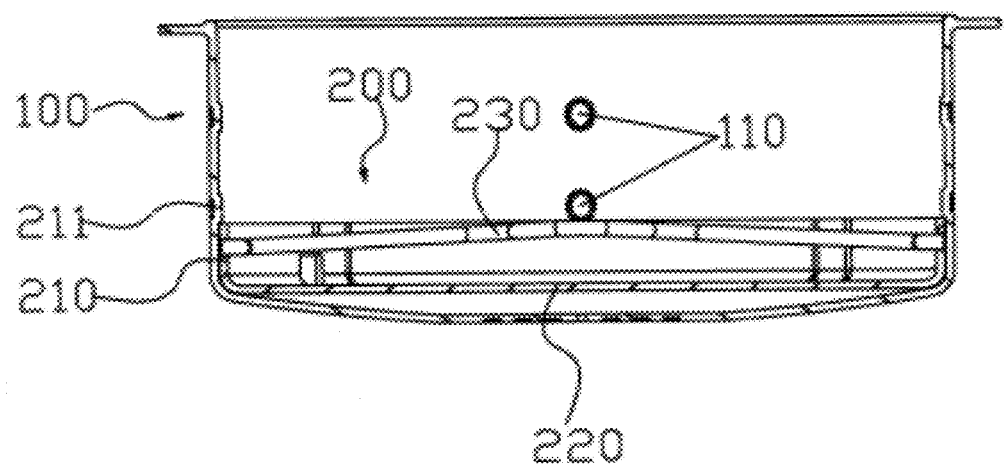
FIG. 2 is a section view of the filter device in a preferred embodiment of the present invention.

Referring to FIGS. 1 and 2, a demountable filtering device, mounted inside the food processor or coffee pot, comprises a shell 100 and a filter 200.

Figure 3:
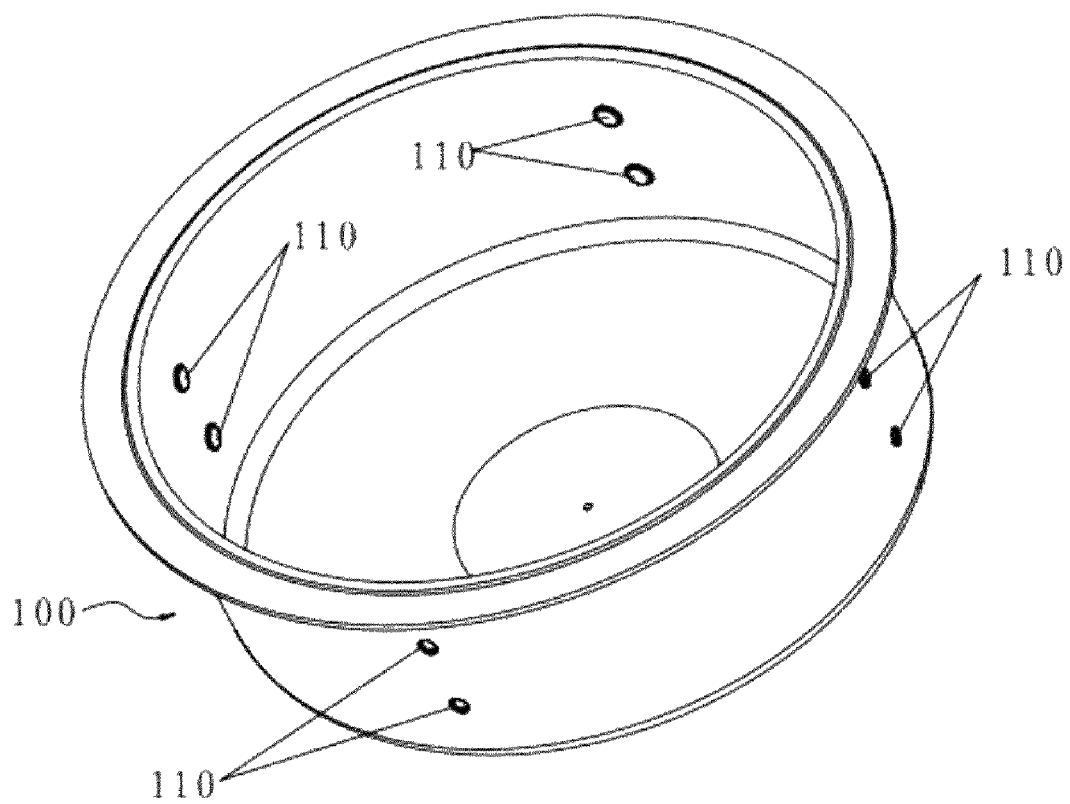
FIG. 3 is a perspective view of the filter device in a preferred embodiment of the present invention.

Referring to FIG. 3, the shell 100 comprises a circular wall with two protrusion arrays 110 disposed uniformly on the inner surface along axial direction. The two protrusion arrays 110 have the same structure and arraying manner. Each protrusion array 110 includes four protrusions 110 in same axial height as the wall. The hole of the shell has a diameter between about 0.4-0.7 mm.

Referring to FIG. 1, the filter 200 comprises a ring 210, a slice 220 connected to lower portion of the inner side of the ring 210, and a handle 230. The diameter of the hole of the slice 220 is between 0.3-0.6 mm. The ring 210 has four uniformly-spaced grooves 211 along axial direction for passing through the protrusions 110. The two ends of the handle 230 pivotally connected to the two ends of a diameter of the ring 210.

The filter 200 housed within the shell 100 is capable of rotating and traveling vertically within the shell. Referring to FIGS. 1 and 2, to assemble, the groove 211 is aimed to the protrusion 110 and the filter 200 is moved to allow the filter 200 to be below the protrusion 110, then the filter 200 is turned to stagger the groove 211 and the protrusion 110, whereby the periphery of the filter 200 can be positioned by the protrusion 110 and cannot move upwardly. To disassemble, the filter 200 is turned to aim the groove 211 at the protrusion 110, then the filter 200 is moved to let the filter 200 move up the protrusion 110.

Figure 4:
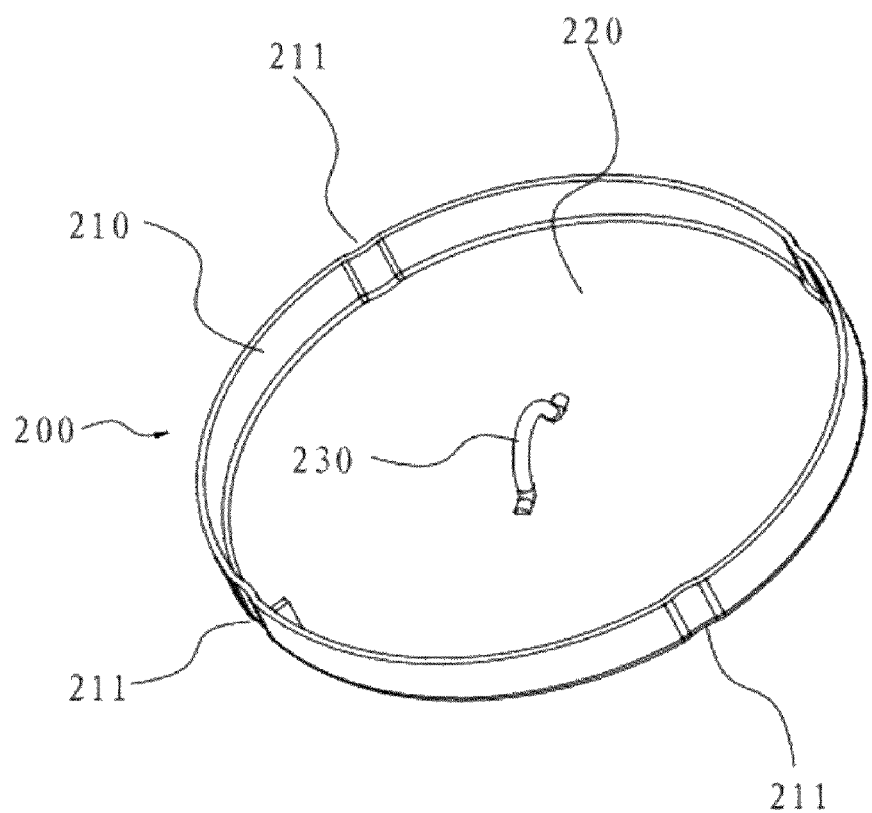
FIG. 4 is a perspective view of the filter device in another preferred embodiment of the present invention.
Figure 5:
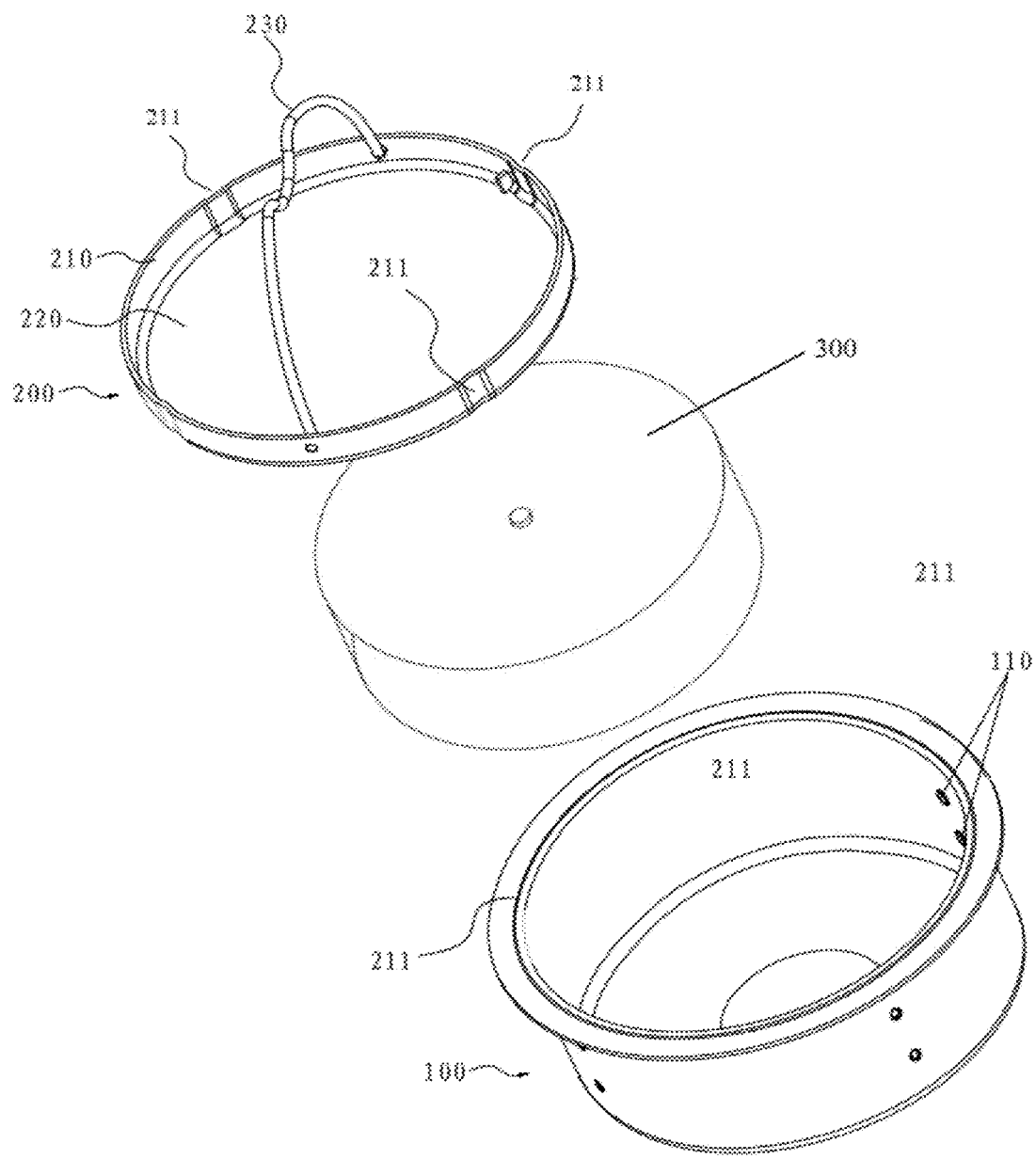
FIG. 5 is an exploded view of the filter device in another preferred embodiment of the present invention.
Figure 6:
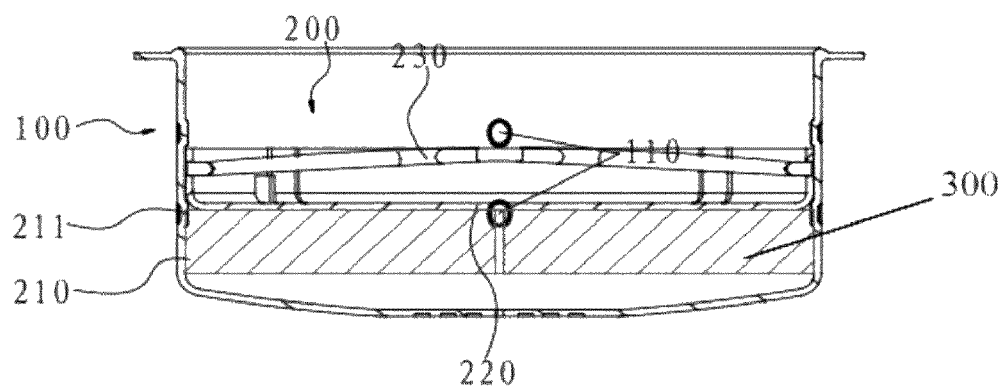
FIG. 6 is a section view of the filter device in another preferred embodiment of the present invention.

Another preferred embodiment is shown in FIG. 4. The difference of this embodiment to the above-mentioned embodiment is that the two ends of the handle 230 are fixed to the slice.

The difference between the third embodiment and the second embodiment is that the filtering device further comprises a plunger 300 positioned between the two protrusion arrays 110, and the filter 200 is positioned beneath the upper protrusion array 110. The material of the plunger 300 can be silica gel, cork or food-grade plastic.

While particular embodiments of the invention have been shown and described, it will be obvious to those in the art that changes and modifications may be made without departing from the invention and, therefore, the aim in the appended claims is to cover all such changes and modifications as fall within the true spirit and scope of the invention.

What is claimed is:

1. A demountable filtering device comprising a shell and a filter, wherein the filter is detachably mounted in the shell, the shell comprises a circular wall and a plurality of protrusions on the inner surface of the circular wall for keeping the filter in the shell, and the filter comprises a plurality of grooves capable of allowing the protrusions to pass through, wherein said filter further comprises a ring and a slice mounted in the lower portion of the inner side of said ring.

2. The demountable filtering device according to claim 1, wherein said filter has a handle.

3. The demountable filtering device according to claim 1, wherein said filter is housed within said shell and is capable of rotating and traveling vertically within said shell.

4. The demountable filtering device according to claim 1, wherein said filter can be located beneath said protrusions, and said grooves and said protrusions are not in alignment.

5. The demountable filtering device according to claim 1, wherein said protrusions are disposed on the inner surface of said circular wall uniformly with the same axis height.

6. The demountable filtering device according to claim 1, wherein said protrusions are disposed on the inner surface of said circular wall uniformly in two arrays, each protrusion of a same array having the same axis height.

7. The demountable filtering device according to claim 6 further comprising a plunger located between the two protrusion arrays, wherein said filter is located beneath the upper protrusion array.

8. The demountable filtering device according to claim 1, wherein said grooves are arranged on said ring.

9. The demountable filtering device according to claim 1, wherein said filter has a handle pivotally connected to said ring.

10. The demountable filtering device according to claim 1, wherein said filter has a handle fixed on said slice.

* * * * *